United States Patent
Griessbach

(10) Patent No.: US 7,197,592 B2
(45) Date of Patent: Mar. 27, 2007

(54) METHOD FOR EXCHANGING DATA BETWEEN SEVERAL STATIONS

(75) Inventor: Robert Griessbach, Weyarn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 417 days.

(21) Appl. No.: 10/296,343

(22) PCT Filed: May 12, 2001

(86) PCT No.: PCT/EP01/05435

§ 371 (c)(1),
(2), (4) Date: Jul. 24, 2003

(87) PCT Pub. No.: WO01/93065

PCT Pub. Date: Dec. 6, 2001

(65) Prior Publication Data

US 2004/0030748 A1    Feb. 12, 2004

(30) Foreign Application Priority Data

May 26, 2000   (DE) ................ 100 26 246

(51) Int. Cl.
*G06F 13/00*   (2006.01)
(52) U.S. Cl. ........................ 710/316; 710/317; 710/311
(58) Field of Classification Search ........ 710/316–317, 710/240–244, 100, 311
See application file for complete search history.

(56) References Cited

U.S. PATENT DOCUMENTS

| 5,832,397 A | 11/1998 | Yoshida et al. ............... 701/29 |
| 5,907,486 A | 5/1999 | Ying |
| 6,032,203 A | 2/2000 | Heidhues |
| 6,292,862 B1 * | 9/2001 | Barrenscheen et al. ..... 710/306 |

FOREIGN PATENT DOCUMENTS

| DE | 197 22 115 | 12/1998 |
| DE | 198 05 464 | 8/1999 |
| DE | 198 54 117 | 5/2000 |
| EP | 0 982 193 A2 | 3/2000 |
| WO | WO 00/07335 | 2/2000 |
| WO | WO 00/07849 | 2/2000 |

* cited by examiner

*Primary Examiner*—Rehana Perveen
*Assistant Examiner*—Kim T. Huynh
(74) *Attorney, Agent, or Firm*—Crowell & Moring LLP

(57) ABSTRACT

In a method for exchanging data between several stations belonging to various data bus systems. The data bus systems are spatially and physically separate from each other. The stations exchange data via control devices which are respectively associated with a data bus system and which are interconnected by means of a faster data bus, which said bus is not busy.

20 Claims, 1 Drawing Sheet

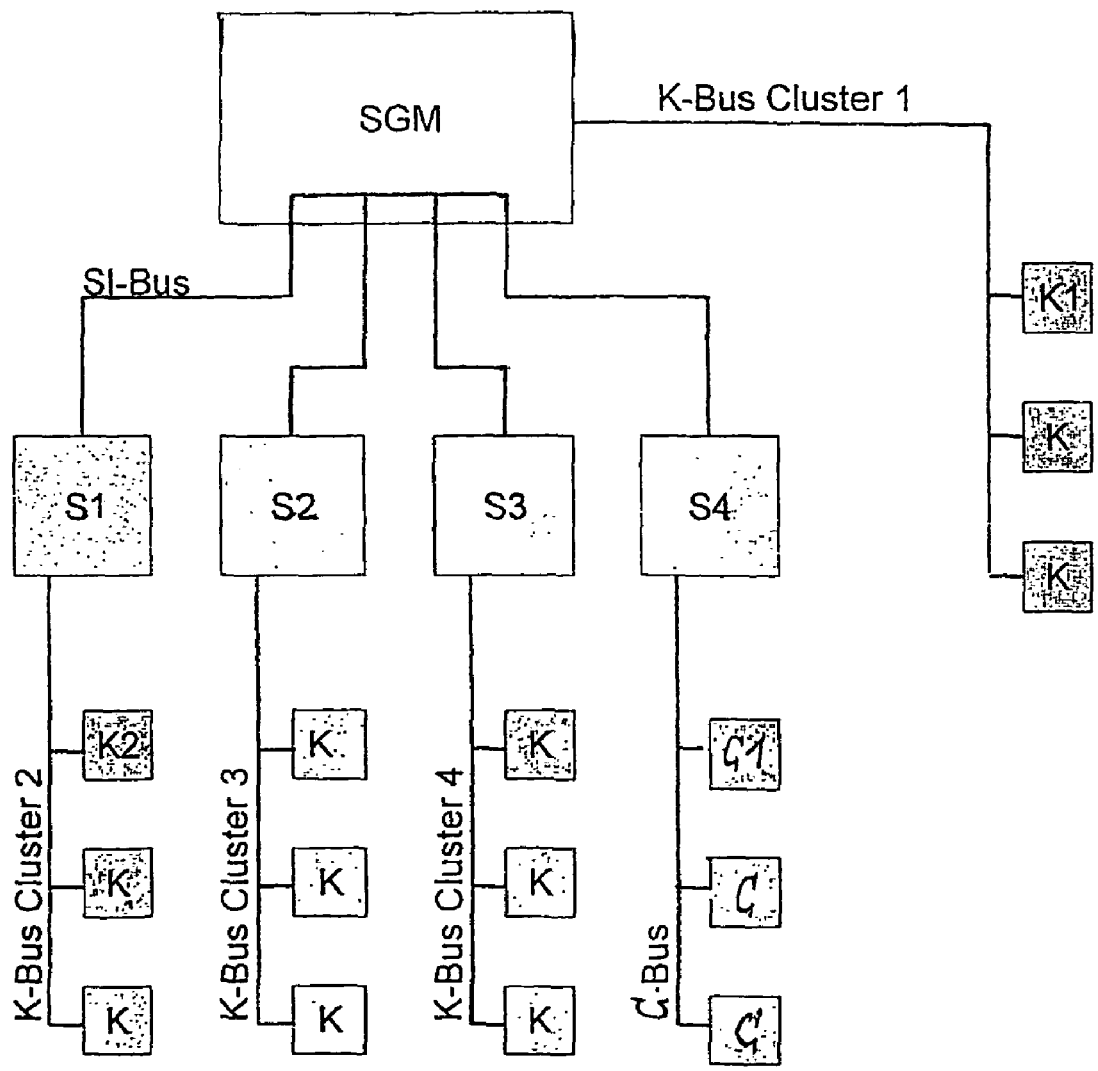

METHOD FOR EXCHANGING DATA BETWEEN SEVERAL STATIONS

BACKGROUND AND SUMMARY OF THE INVENTION

This application claims the priority of German patent document 100 26 246.5, filed 26 May 2000 (PCT No.: PCT/EP01/05435), the disclosure of which is expressly incorporated by reference herein.

This case is related to co-pending U.S. patent application Ser. No. 10/296,344 filed Aug. 15, 2002.

The invention relates to a method for exchanging data between a plurality of subscribers which belong to different data bus systems.

Modern vehicles frequently include several (preferably standardized) data buses. For engine and chassis components, for example, one system is used which is adapted to that application, while another suitably designed bus system is used for audio and telecommunication peripheries. Data exchange between the different bus systems takes place by way of a plurality of gateways.

An attempt to transfer this bus system architecture which is used in higher-priced vehicles to vehicles of lower cost, however, results in high expenditures, due on the one hand, to the high costs of the standard bus for engine and chassis components and, on the other hand, to the cost of a gateway which are high because of the computer required for this purpose. The construction of a separate onboard network structure for lower priced vehicles is problematic in that it is largely impossible to take over individual components of the higher-priced vehicles because of a lack of compatibility. In addition, a conflict arises due to differing goals. For lowering the cost, the transmission rate can be reduced and the number of bus subscribers can be increased, which results in long response times and low flexibility, because subscriber numbers differ from one vehicle to the next. Every addition of a new subscriber (for example, as a result of a subsequently installed component) requires considerable adaptation expenditures.

It is an object of the invention to provide a highly efficient method of exchanging data among the subscribers of different data bus systems which can serve a plurality of subscribers that vary in a vehicle-specific manner.

The method according to the invention is modular and cost-effective. It permits the use of the same basic components in all vehicles covering several model series of a manufacturer. The higher-quality vehicles can be arbitrarily equipped with additional components, without being more expensive than comparable series systems.

A prerequisite for the invention is the existence of a faster data bus, such as for example the data bus described in German Patent Documents DE 19636441 A and DE 19636442 A. This data bus is distinguished by a transmission rate of more than 5 Mbits/s and is suitable, for example, for passive safety systems, such as air bags, belt tighteners, and the like, as well as the pertaining sensor system and actuators and their control units.

The control units are situated at different points of the vehicle (for example, in the area of the transmission tunnel or the B-columns, in the door or at the steering column). All such control units are connected with the data bus which, in normal situations (that is, outside a crash phase or serious misuse phase), is not utilized to a great degree. The same applies to the utilization of the processors in the control units.

According to the invention, these control units are also used for other functions. These functions are part of different function peripheries, for example, on the one hand, the electronic system of the vehicle body, and relate, for example, to the light control, the wiper control, the central locking system and the window lift mechanism control, and, on the other hand, the data bus systems for engine and chassis components.

Instead of a gateway for the transition between the data bus systems, the gateway functionality is apportioned to the two control units of the faster data bus, which already exist anyhow, with the possibility of achieving a required computing performance by means of the computer which is already present in the control unit.

In addition, it becomes possible to divide each of the two data bus systems into smaller subordinate data bus systems which each, by way of one of the control units connected to the faster data bus, feed their data to this data bus or take it over from the latter.

Thus, the periphery of the electronic system of the vehicle body can be divided into the light control and the wiper control, on the one hand, and the central locking system and the window lifter control, on the other hand. These are each a component of a subordinate data bus system which, in each case, because of the minimized number of subscribers (in the case of the light control, for example, one control unit and connected consuming devices), has a satisfactory response time and is also operable at a low transmission rate; that is, rapidly and securely provide the connected subscribers with the required data, or cause them to be provided with the required data. As a result, it is also possible to connect control units the electronic system of the vehicle body or of the engine management (with higher demands on the communication), directly to the faster data bus.

With such an onboard network system structure, the need for a separate data bus for the components of the electronic system of the vehicle body is eliminated, because these components are connected to the faster data bus, either directly or via otherwise existing, control units. This results in the elimination of the gateway functionality and thus of separate gateways.

Other objects, advantages and novel features of the present invention will become apparent from the following detailed description of the invention when considered in conjunction with the accompanying drawings.

BRIEF DESCRIPTION OF THE DRAWINGS

The single FIGURE shows a data bus structure according to the invention and an onboard network system of a vehicle implemented thereby and the communication process carried out by means of it is described.

DETAILED DESCRIPTION OF THE DRAWINGS

The block diagram illustrated in the figure includes, among other things, a control unit module SGM and control units S1 to S4. In their entirety, these components are connected by a faster data bus "Sl bus" for a passive safety system having a transmission rate of, for example, 5 Mbits/s. A plurality of control units "K" are connected to the control units SGM and S1 to S3, the control units marked "K" each separately forming a subordinate data bus system K-bus cluster 1, K-bus cluster 2, K-bus cluster 3, and K-bus cluster 4, assigned to the electronic system of the vehicle body. In addition, a data bus system C-Bus with subscribers C, which is assigned to engine management, is connected to the control unit S4. The components SGM and S1 to S4 therefore contain the functions of the passive safety system, the basic functions of the electronic system of the vehicle body and the functions of the engine management. Within the subordinate data bus systems, several control units K are separately marked K1 or K2 for further explanations; within the C-bus, a control unit is marked C1.

With respect to the basic functions of the electronic system of the vehicle body, the control units SGM and S1 to S3 adapt the format of the data of the subordinate data bus subscribers K to the data format of the faster data bus. The control unit S4 implements this for the data of the C-bus subscribers. Also, the control units SGM and S1 to S4 convert the data of the faster data bus from this format to the data format of the connected subordinate data bus system or C-bus system. For this purpose, the data of all subordinate data bus subscribers and the subscribers of the C-bus system and of the faster data bus Sl bus are provided with an unambiguous identification. The identifications of the subscribers of the connected subordinate data bus system and of the C-bus system are stored in the respective control unit.

One advantage of the data bus structure according to the invention is that the number of messages per subordinate data bus is significantly lower than in the case of a data bus with only one branch. Moreover, as a result of the small number of subscribers, the waiting time to a possible bus access is short. In addition, the subscribers of different data bus systems can communicate with one another without requiring a separate gateway computer for this purpose.

In order to provide a system which is as flexible as possible, it is necessary that subordinate data bus subscribers (in the case of K-bus subscribers) and C-bus subscribers basically have access to all required information of the overall system. In addition, it should be possible without any basic change to "clamp over" a K-bus subscriber from one subordinate data bus to another. As a result, it is possible, for example, to place a window lifter switch block in one vehicle series in the door and in the other vehicle series on the center console.

The K-and C-bus addresses are unambiguous throughout the entire system. The corresponding C- or K-bus messages are transposed according to a fixed rule, to bus messages of the faster data bus with corresponding unambiguous IDs. In the control units SGM and S1 to S4, encodable "mini-gateway tables" then cause the transfer of only those messages which are needed in the respective subordinate data bus system. Therefore, for the movement of one control unit from one subordinate data K-bus to another, only these gateway tables need then be recoded. The overall system behavior therefore remains absolutely unchanged.

The data exchange within the overall system is explained by an example. For transmission of a K-bus message TK1 from subscriber K1 at the K-bus cluster 1 to subscriber K2 at the K-bus cluster 2 is described as an example, in which the faster data bus is referred to as an Sl bus. K1 sends message TK1 to K-bus cluster 1, triggered, for example, by a pressure on a key. SGM receives TK1 and wraps the message TK1 into the data field of an Sl bus message.

Each Sl bus subscriber receives TK1 in the Sl bus format and checks in its gateway table whether TK1 is to be transmitted to its K-bus cluster. S1 unwraps TK1 from the Sl bus format and transmits TK1 to the K-bus cluster 2. K2 receives TK1.

If the messages of the K-bus subscribers are longer than the length of the data of the Sl bus (for example, 32 bytes of useful data in comparison to 12 bytes of useful data), a segmented (that is, repeated), transmission of defined telegram parts is required.

If, for any reason, not K2 but Cl is to receive the TK1, TK1 it need only be deleted from the gateway table of S1 and entered into the gateway table of S4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of exchanging data between a plurality of subscribers which belong to different first data bus systems, wherein:
the first data bus systems are spatially and physically separate from one another;
via control units each assigned to one of said first data bus systems and connected with one another by way of a second data bus, said subscribers exchange data at times when the second data bus is not busy; and
the second data bus is faster than the first data buses.

2. The method according to claim 1, wherein the subscribers within a first data bus system are arranged in at least two spatially and physically mutually separate subordinate data bus systems; and
each subordinate data bus system is connected by way of a pertaining control unit to a faster data bus.

3. The method according to claim 1, wherein the control units adapt a format of data of the subscribers of the connected data bus system to a data format of the faster data bus, or vice versa.

4. The method according to claim 1, wherein the subscribers of the first data bus systems and the subscribers of the faster data bus have an unambiguous identification.

5. The method according to claim 4, wherein identifications of the subscribers of connected first data bus system are stored in the respective control unit.

6. The method according to claim 5, wherein the identifications of the subscribers of not connected data bus systems are stored in the respective control unit.

7. The method according to claim 6, wherein identifications of the not connected subscribers are contained in a programmable memory.

8. The method according to claim 7, wherein data transmission from a respective first data bus system to the faster data bus and vice-versa is controlled by means of memory content.

9. The method according to claim 8, wherein in the event of a disturbance of the data bus system, the respective control units do not transmit the data of the connected data bus system to the second data bus.

10. A system comprising:
at least two different first data bus systems arranged spatially and physically separate from one another;
at least one control unit coupled to each one of the at least two different first data bus systems;
at least one subscriber coupled to each one of the at least two different first data bus systems; and
a second data bus coupling the at least one control unit of each one of the at least two different first data bus systems,
wherein the at least one subscriber coupled to each one of the at least two different data bus systems exchange data over the second data bus at times when the second data bus is not busy and the second data bus is faster than the at least two different first data bus systems.

11. The system of claim 10, wherein the second data bus is a component of a passive safety system.

12. The system of claim 11, wherein one of the at least one subscribers is a component of an engine management system.

13. The system of claim 11, wherein one of the at least one subscribers is a component of a vehicle electrical system.

14. The system of claim 10, wherein one of the at least one control units adapt a format of data of one of the at least one subscribers from a format of one of the at least two different first data bus systems to a data format of the second data bus, or vice versa.

15. The system of claim 10, wherein each of the at least one control units coupled to each one of the at least two different first data bus systems comprise a table identifying subscribers coupled to the particular one of the at least two different first data bus systems.

16. A method of exchanging data between a plurality of subscribers which belong to different first data bus systems, the different first data bus systems are spatially and physically separate from one another, the method comprising the acts of:

receiving, by a control unit assigned to one of the different first data bus systems, data from a subscriber of the one of the different first data bus systems;

transferring, by the control unit assigned to one of the different first data bus systems, the data to a second data bus when the second data bus is not busy, the second data bus being faster than the different first data bus systems;

receiving, by a control unit assigned to another of the different first data bus systems, the data;

transferring, by the control unit assigned to another of the different first data bus systems, the data to a subscriber of the another different first data bus system when the subscriber of the another different first data bus system is an intended subscriber for the data.

17. The method according to claim 16, further comprising the act of:

adapting, by the control unit assigned to one of the different first data bus systems, a format of the data to a data format of the second data bus.

18. The method according to claim 16, wherein each of the subscribers of the one and the another different first data bus systems have an unambiguous identification.

19. The method according to claim 16, wherein identifications of subscribers of not connected data bus systems are stored in a respective control unit.

20. The method according to claim 19, wherein the identifications of the not connected subscribers are contained in a programmable memory.

* * * * *